(12) United States Patent
Ogino (10) Patent No.: US 9,283,515 B2
(45) Date of Patent: Mar. 15, 2016

(54) CARBON DIOXIDE RECOVERY DEVICE AND CARBON DIOXIDE RECOVERY SYSTEM

(75) Inventor: Tomoyuki Ogino, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 352 days.

(21) Appl. No.: 14/117,235

(22) PCT Filed: May 7, 2012

(86) PCT No.: PCT/JP2012/002986
§ 371 (c)(1),
(2), (4) Date: Dec. 11, 2013

(87) PCT Pub. No.: WO2012/153508
PCT Pub. Date: Nov. 15, 2012

(65) Prior Publication Data
US 2014/0216263 A1    Aug. 7, 2014

(30) Foreign Application Priority Data

May 11, 2011    (JP) ................................ 2011-106425

(51) Int. Cl.
*C01B 31/20*    (2006.01)
*B01D 53/62*    (2006.01)
*B01D 53/14*    (2006.01)

(52) U.S. Cl.
CPC ........ *B01D 53/1475* (2013.01); *B01D 53/1425* (2013.01); *B01D 53/62* (2013.01); *C01B 31/20* (2013.01); *B01D 2253/25* (2013.01); CPC ... *B01D2257/504* (2013.01); *Y02C 10/06* (2013.01); *Y02C 10/08* (2013.01); *Y02P 20/152* (2015.11)

(58) Field of Classification Search
CPC .......... B01D 53/1425; B01D 53/1475; B01D 53/62; B01D 2253/25; B01D 2257/504; C01B 30/20; Y02C 10/06; Y02C 10/08; Y02P 20/152

USPC ............ 96/131, 143, 153, 234, 242; 423/226, 423/228–230
See application file for complete search history.

(56) References Cited

U.S. PATENT DOCUMENTS

| | | | | | |
|---|---|---|---|---|---|
| 3,491,031 | A | * | 1/1970 | Stoneburner | B01D 53/02 423/210 |
| 5,061,455 | A | * | 10/1991 | Brose | B01D 53/04 423/228 |
| 5,876,488 | A | * | 3/1999 | Birbara | B01D 53/1475 422/178 |
| 8,500,854 | B1 | * | 8/2013 | Pennline | B01D 53/0462 95/117 |
| 8,840,704 | B2 | * | 9/2014 | Shoji | B01D 53/025 423/228 |
| 2009/0294366 | A1 | * | 12/2009 | Wright | B01D 53/02 210/683 |

FOREIGN PATENT DOCUMENTS

JP    A-2007-61777    3/2007

\* cited by examiner

*Primary Examiner* — Frank Lawrence
(74) *Attorney, Agent, or Firm* — Oliff PLC (57) ABSTRACT

A carbon dioxide recovery device can perform a carbon dioxide adsorption treatment, a carbon dioxide separation treatment, a carbon dioxide adsorbing material repair treatment, and a carbon dioxide adsorbing material manufacture treatment. The carbon dioxide recovery device includes: a casing including a fluid treatment passage, a gas supply port through which a fluid is supplied to the fluid treatment passage, and a gas exhaust port through which the gas supplied to the fluid treatment passage is discharged; a plurality of housing tanks provided in a fluid treatment passage and each configured to house carbon dioxide adsorbing materials K; and an adsorbing liquid supplying portion configured to supply an adsorbing liquid to the housing tanks. Passage opening-closing mechanisms configured to store the adsorbing liquid in or discharge the adsorbing liquid from the housing tanks are respectively provided at bottom portions of the housing tanks.

8 Claims, 3 Drawing Sheets

CARBON DIOXIDE RECOVERY DEVICE AND CARBON DIOXIDE RECOVERY SYSTEM

TECHNICAL FIELD

The present invention relates to a carbon dioxide recovery device and a carbon dioxide recovery system, each of which is capable of manufacturing and repairing (restoring) a carbon dioxide adsorbing material, adsorbing carbon dioxide, and regenerating the carbon dioxide adsorbing material.

BACKGROUND ART

One example of conventional carbon dioxide recovery devices is a device capable of generating a gas from which carbon dioxide has been removed, by causing a carbon dioxide adsorbing material to adsorb carbon dioxide contained in a treatment target gas, the carbon dioxide adsorbing material being prepared by causing a porous substance to support an adsorbing liquid capable of adsorbing carbon dioxide. In addition, the conventional carbon dioxide recovery device can separate the carbon dioxide, adsorbed by the carbon dioxide adsorbing material, to regenerate the carbon dioxide adsorbing material.

Another example of the conventional carbon dioxide recovery devices is a device including an absorption tower and a regeneration tower (see PTL 1, for example). In the absorption tower, a treatment target gas containing carbon dioxide and a carbon dioxide absorbing liquid capable of absorbing carbon dioxide are caused to contact each other. With this, the carbon dioxide absorbing liquid absorbs the carbon dioxide contained in the treatment target gas to remove the carbon dioxide from the treatment target gas. Thus, the absorption tower generates a gas from which the carbon dioxide has been removed.

The regeneration tower heats a rich solution (carbon dioxide absorbing liquid), which has absorbed the carbon dioxide, by a regenerative heater to regenerate the carbon dioxide absorbing liquid from which the carbon dioxide has been removed. Then, a lean solution (carbon dioxide absorbing liquid) from which the carbon dioxide has been removed by the regeneration tower is reutilized in the absorption tower.

CITATION LIST

Patent Literature

PTL 1: Japanese Laid-Open Patent Application Publication No. 2007-61777

SUMMARY OF INVENTION

Technical Problem

However, in a case where the former conventional carbon dioxide recovery device repeats the generation of the gas from which the carbon dioxide has been removed by causing the carbon dioxide adsorbing material to adsorb the carbon dioxide contained in the treatment target gas and the regeneration of the carbon dioxide adsorbing material by separating the carbon dioxide adsorbed by the carbon dioxide adsorbing material, the adsorbing liquid supported by the carbon dioxide adsorbing material deteriorates or vaporizes, and thus the performance of the carbon dioxide adsorbing material deteriorates.

Therefore, in a case where the carbon dioxide adsorbing material has been used for a certain period of time, a repair treatment for restoring the decreased performance of the carbon dioxide adsorbing material needs to be performed. This repair treatment requires a supporting facility configured to cause the porous substance to support the adsorbing liquid capable of adsorbing the carbon dioxide and a drying facility configured to dry the porous substance supporting the adsorbing liquid.

In addition, when manufacturing the new carbon dioxide adsorbing material, the supporting facility configured to cause the porous substance to support the adsorbing liquid and the drying facility configured to dry the porous substance supporting the adsorbing liquid are required.

However, to prepare the supporting facility and the drying facility, the cost for these facilities is required, and spaces for installing these facilities are also required.

Further, since the latter conventional carbon dioxide recovery device requires the absorption tower and the regeneration tower as separate facilities, the cost for these facilities is required, and spaces for installing these facilities are also required.

The present invention was made to solve the above problems, and an object of the present invention is to provide a carbon dioxide recovery device and a carbon dioxide recovery system, each of which is capable of reducing its cost, size, and installation space by achieving both an adsorption-regeneration function of adsorbing carbon dioxide and regenerating a carbon dioxide adsorbing material and a repair-manufacture function of repairing and manufacturing the carbon dioxide adsorbing material by a common device.

Solution to Problem

A carbon dioxide recovery device according to the present invention is configured to: cause a carbon dioxide adsorbing material to adsorb carbon dioxide contained in a treatment target gas, the carbon dioxide adsorbing material being prepared by causing a porous substance to support an adsorbing liquid for adsorbing the carbon dioxide; separate the carbon dioxide adsorbed by the carbon dioxide adsorbing material; and causing the carbon dioxide adsorbing material or the porous substance to support the adsorbing liquid, and the carbon dioxide recovery device includes: a casing including a fluid treatment passage through which a fluid flows, one or two or more gas supply ports through which a gas is supplied to the fluid treatment passage, and one or two or more gas exhaust ports through which the gas supplied to the fluid treatment passage is discharged; a housing tank provided in the fluid treatment passage and configured to house the carbon dioxide adsorbing material, and an adsorbing liquid supplying portion configured to supply the adsorbing liquid to the housing tank, wherein a passage opening-closing mechanism configured to open or close the fluid treatment passage to discharge or store the adsorbing liquid supplied to the housing tank is provided at a bottom portion of the housing tank or under the housing tank.

When the carbon dioxide recovery device according to the present invention adsorbs the carbon dioxide from the treatment target gas containing the carbon dioxide, the passage opening-closing mechanism opens the fluid treatment passage, and the treatment target gas is supplied through the gas supply port of the casing to flow into the fluid treatment passage. With this, the carbon dioxide contained in the treatment target gas contacts the carbon dioxide adsorbing materials in the housing tank in the fluid treatment passage to be adsorbed by the carbon dioxide adsorbing materials (adsorption treatment), and the gas having the low carbon dioxide concentration can be discharged through the gas exhaust port. As above, the carbon dioxide can be recovered from the treatment target gas.

Then, when separating the carbon dioxide from the carbon dioxide adsorbing material that has adsorbed the carbon dioxide, the passage opening-closing mechanism opens the fluid treatment passage, and, the example, as heated gas is supplied through the gas supply port to flow into the fluid treatment passage, thereby heating the carbon dioxide adsorbing materials. With this, the carbon dioxide can be separated from the carbon dioxide adsorbing materials, and the separated carbon dioxide can be discharged through the gas exhaust port. As above, the carbon dioxide adsorbing materials can be regenerated (regeneration treatment).

When repairing the carbon dioxide adsorbing materials, whose carbon dioxide adsorption performance has been deteriorated, by causing the carbon dioxide adsorbing materials to support the adsorbing liquid or when manufacturing the carbon dioxide adsorbing material, first, the carbon dioxide adsorbing materials (or the porous substances) are arranged in the housing tank, and the passage opening-closing mechanism closes the fluid treatment passage such that the adsorbing liquid can be stored in the housing tank. In this state, by supplying the adsorbing liquid to the housing tank by the adsorbing liquid supplying portion, the carbon dioxide adsorbing materials (or the porous substances) in the housing tank are immersed in the adsorbing liquid. Thus, the carbon dioxide adsorbing materials (or the porous substances) can support the adsorbing liquid. Next, the passage opening-closing mechanism opens the fluid treatment passage, and the adsorbing liquid in the housing tank is discharged. Then, for example, a dry gas is supplied through the gas supply port to flow into the fluid treatment passage. Thus, the carbon dioxide adsorbing materials (or the porous substances) supporting the adsorbing liquid are dried. With this, the carbon dioxide adsorbing materials can be repaired (or manufactured) (the repair treatment or the manufacture treatment).

The carbon dioxide recovery device according to the present invention may be configured such that: the passage opening-closing mechanism includes a movable plate-shaped member and a fixed plate-shaped member; a large number of through holes are dispersively formed on each of the movable plate-shaped member and the fixed plate-shaped member; and when the movable plate-shaped member has moved to a predetermined open position or closed position, an open state where a large number of first through holes that are the large number of through holes of the movable plate-shaped member respectively overlap a large number of second through holes that are the large number of through holes of the fixed plate-shaped member is realized, or a closed state where the large number of first through holes of the movable plate-shaped member do not overlap the large number of second through holes of the fixed plate-shaped member is realized.

With this, the fluid treatment passage can be opened or closed only by moving the movable plate-shaped member to a predetermined open position or closed position. Therefore, the passage opening-closing mechanism used when performing each of the adsorption treatment of adsorbing the carbon dioxide, the regeneration treatment of regenerating the carbon dioxide adsorbing materials, the repair treatment of restoring the carbon dioxide adsorbing materials, and the manufacture treatment of manufacturing the carbon dioxide adsorbing materials can be simplified in configuration and reduced in size.

Then, a large number of through holes are dispersively formed on each of the movable plate-shaped member and the fixed plate-shaped member. Therefore, when performing each of the adsorption treatment, the regeneration treatment, the repair treatment, and the manufacture treatment, the treatment target gas, the heated gas, or the dry gas can be caused to flow through a large number of dispersively-formed first and second through holes to evenly contact the porous substances or carbon dioxide adsorbing materials in the housing tank. With this, each treatment using the treatment target gas, the heated gas, or the dry gas can be surely performed in a short period of time. Further, the carbon dioxide separated from the carbon dioxide adsorbing materials can be smoothly discharged without being accumulated in the housing tank.

The carbon dioxide recovery device according to the present invention may further include a circulation line, which includes the fluid treatment passage as a part thereof and through which an inactive gas circulates, wherein the inactive gas dries the carbon dioxide adsorbing material in the housing tank.

For example, in each of the repair treatment and the manufacture treatment, in a case where the adsorbing liquid supported by the carbon dioxide adsorbing material is dried by using the inactive gas, the oxidation of the adsorbing liquid can be prevented, and the deterioration of the carbon dioxide adsorption performance of the adsorbing liquid can be prevented. Then, the inactive gas is caused to circulate in the circulation line, including the fluid treatment passage as a part thereof, to dry the carbon dioxide adsorbing materials. Thus, the carbon dioxide adsorbing materials can be dried by using a small amount of inactive gas.

The carbon dioxide recovery device according to the present invention may be configured such that a condenser configured to condense moisture contained in the inactive gas and a heater configured to heat the inactive gas are disposed on the circulation line of the inactive gas.

With this, the condenser can condense and remove moisture (containing moisture evaporated from the carbon dioxide adsorbing materials) contained in the inactive gas. Then, the heater can heat the inactive gas to accelerate the drying of the carbon dioxide adsorbing materials. With this, the adsorbing liquid supported by the carbon dioxide adsorbing materials in the housing tank can be efficiently dried.

The carbon dioxide recovery device according to the present invention may be configured such that: the housing tank is one of a plurality of housing tanks provided along an upper-lower direction in the casing; and the passage opening-closing mechanism is one of a plurality of passage opening-closing mechanisms provided at the bottom portions of the plurality of housing tanks.

With this, when regenerating or manufacturing the carbon dioxide adsorbing materials, for example, first, the passage opening-closing mechanisms are operated such that the bottom portions of the upper and lower housing tanks become the closed state. Next, the adsorbing liquid is supplied to the upper housing tank, and the carbon dioxide adsorbing materials or porous substances in the upper housing tank support the adsorbing liquid. Then, the passage opening-closing mechanism is operated such that the bottom portion of the upper housing tank becomes the open state. With this, the adsorbing liquid supplied to the upper housing tank can be discharged from the upper housing tank to be transferred to the lower housing tank. Thus, the carbon dioxide adsorbing materials or porous substances in the lower housing tank can support the adsorbing liquid. Therefore, by using the adsorbing liquid, the amount of which is an amount used by a single housing tank, the carbon dioxide adsorbing materials or porous substances in a plurality of housing tanks can support the adsorbing liquid. On this account, the amount of adsorbing liquid used when repairing or manufacturing the carbon dioxide adsorbing materials can be reduced.

The carbon dioxide recovery device according to the present invention may be configured such that the plurality of housing tanks are one or two or more upper housing tanks provided at an upper side in the casing and one or two or more lower housing tanks provided at a lower side in the casing; and the adsorbing liquid supplying portion is configured to supply the adsorbing liquid to an uppermost housing tank among said one or two or more upper housing tanks and an uppermost housing tank among said one or two or more lower housing tanks.

With this, the carbon dioxide adsorbing materials can be repaired or manufactured by separately supplying the absorbing liquid to one or two or more upper housing tanks and one or two or more lower housing tanks. With this, it is possible to shorten a repair time of repairing the carbon dioxide adsorbing materials in the plurality of housing tanks in the casing and a manufacture time of manufacturing the carbon dioxide adsorbing materials from the porous substances.

The carbon dioxide recovery device according to the present invention may be configured such that the adsorbing liquid supplying portion sprays the adsorbing liquid in the form of liquid droplets to the carbon dioxide adsorbing material or porous substance in the housing tank.

With this, when supplying the adsorbing liquid to the housing tank to repair or manufacture the carbon dioxide adsorbing materials, the adsorbing liquid supplying portion can evenly spray the adsorbing liquid in the form of liquid droplets to the carbon dioxide adsorbing materials or porous substances in the housing tank. With this, the adsorbing liquid can be surely supported by the entire surfaces of the carbon dioxide adsorbing materials or the like without forming air bubbles on the surfaces of the carbon dioxide adsorbing materials or the like. According to the repaired or manufactured carbon dioxide adsorbing materials, the carbon dioxide adsorption ability thereof can be improved and uniformized.

A carbon dioxide recovery system according to the present invention includes a plurality of carbon dioxide recovery devices, each of which is the carbon dioxide recovery device according to the present invention, wherein one of the carbon dioxide recovery devices performs an adsorption treatment of adsorbing the carbon dioxide contained in the treatment target gas, and the other carbon dioxide recovery device(s) performs a regeneration treatment of separating the carbon dioxide adsorbed by the carbon dioxide adsorbing material, a repair treatment of causing the carbon dioxide adsorbing material to support the adsorbing liquid, and a manufacture treatment of causing the porous substance to support the adsorbing liquid.

According to the carbon dioxide recovery system of the present invention, while one of the carbon dioxide recovery devices is performing the adsorption treatment of adsorbing the carbon dioxide contained in the treatment target gas, the other carbon dioxide recovery device(s) can perform the regeneration treatment of separating the carbon dioxide adsorbed by the carbon dioxide adsorbing materials, the repair treatment of causing the carbon dioxide adsorbing materials to support the adsorbing liquid, and the manufacture treatment of causing the porous substances to support the adsorbing liquid.

With this, the adsorption treatment of adsorbing the carbon dioxide contained in the treatment target gas can be continuously performed without interruption by using one of the carbon dioxide recovery devices included in the carbon dioxide recovery system. Further, since the adsorption treatment, the regeneration treatment, the repair treatment, and the manufacture treatment can be monitored collectively, the labor of the operation management can be reduced, and the cost for the operation management can be suppressed.

Advantageous Effects of Invention

According to the carbon dioxide recovery device and carbon dioxide recovery system of the present invention, an adsorption-regeneration facility of adsorbing the carbon dioxide and regenerating the carbon dioxide adsorbing materials and a repair-manufacture facility of repairing and manufacturing the carbon dioxide adsorbing materials do not have to be prepared separately. As above, the carbon dioxide adsorption treatment, the carbon dioxide adsorbing material regeneration treatment, the carbon dioxide adsorbing material repair treatment, and the carbon dioxide adsorbing material manufacture treatment can be performed by using a single facility. As a result, the carbon dioxide recovery device having these treatment functions can be reduced in cost, size, and installation space.

Further, when manufacturing or repairing the carbon dioxide adsorbing materials, the adsorbing liquid is just filled in the housing tank and does not have to be filled in the entire casing. Therefore, the amount of adsorbing liquid required can be reduced.

DESCRIPTION OF EMBODIMENTS

Hereinafter, one embodiment of a carbon dioxide recovery system according to the present invention will be explained in reference to FIGS. 1 to 3. A carbon dioxide recovery system 11 shown in FIG. 1 includes a first carbon dioxide recovery device 12 and a second carbon dioxide recovery device 12. The first carbon dioxide recovery device 12 and the second carbon dioxide recovery device 12 are the same as each other.

Each of the first and second carbon dioxide recovery devices 12 can generate a clean gas whose carbon dioxide concentration is reduced, by causing carbon dioxide adsorbing materials K to adsorb (recover) carbon dioxide contained in a treatment target gas (adsorption treatment), the carbon dioxide adsorbing materials K being prepared by causing porous substances to support an adsorbing liquid capable of adsorbing carbon dioxide. Then, each of the first and second carbon dioxide recovery devices 12 can separate the carbon dioxide, adsorbed by the carbon dioxide adsorbing materials K, to regenerate the carbon dioxide adsorbing materials K (regeneration treatment). Further, each of the first and second carbon dioxide recovery devices 12 can restore the carbon dioxide adsorbing materials K whose carbon dioxide adsorption performance has been deteriorated (repair treatment), and can manufacture the carbon dioxide adsorbing materials K (manufacture treatment).

Here, examples of the treatment target gas containing the carbon dioxide include indoor air in a sealed living space, indoor air in an air-conditioned office or the like, and a flue gas discharged from a boiler or the like.

In the present embodiment, the first and second carbon dioxide recovery devices 12 are controlled such that while one of the first and second carbon dioxide recovery devices 12 is performing the adsorption treatment, the other performs the regeneration treatment, the repair treatment, and the manufacture treatment. With this, the adsorption treatment of adsorbing the carbon dioxide contained in the treatment target gas can be continuously performed without interruption by using either one of the carbon dioxide recovery devices 12 included in the carbon dioxide recovery system 11. Further, since the adsorption treatment, the regeneration treatment, the repair treatment, and the manufacture treatment can be monitored collectively, the labor of the operation management can be reduced, and the cost for the operation management can be suppressed.

Since the first carbon dioxide recovery device 12 and the second carbon dioxide recovery device 12 are the same as each other, the following will explain the first carbon dioxide recovery device 12, and the explanation of the second carbon dioxide recovery device 12 is omitted.

The first carbon dioxide recovery device 12 includes a first casing 13, housing tanks 14, and adsorbing liquid supplying portions 15, and passage opening-closing mechanisms 16 are respectively provided at the housing tanks 14.

Figure 1:
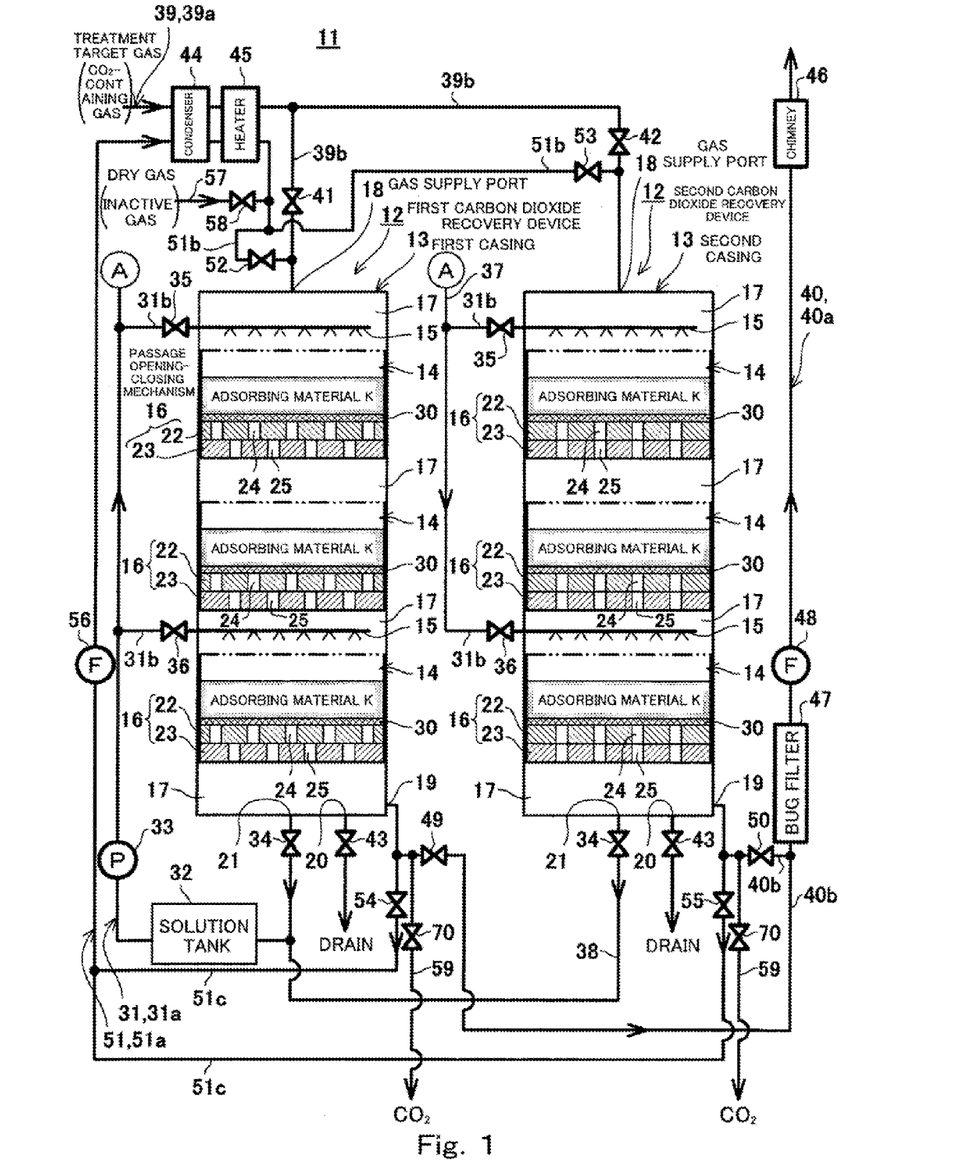
FIG. 1 is a diagram showing a carbon dioxide recovery system according to one embodiment of the present invention.

The first casing 13 shown in FIG. 1 is formed in, for example, a cylindrical shape, and upper and lower opening portions thereof are closed and sealed by an upper wall portion and a lower wall portion, respectively. The first casing 13 includes a fluid treatment passage 17 through which a fluid flows, and a gas supply port 18 through which a gas is supplied to the fluid treatment passage 17 is formed at the upper wall portion of the first casing 13. A gas exhaust port 19 through which the gas supplied to the fluid treatment passage 17 is discharged is formed at a side wall portion of a lower portion of the first casing 13.

A drain port 20 through which a drain in the first casing 13 is discharged and an adsorbing liquid exhaust port 21 through which the adsorbing liquid is discharged are formed at the lower wall portion of the first casing 13.

As shown in FIG. 1, a plurality of housing tanks 14 are fixed in the first casing 13 so as to be spaced apart from one another along an upper-lower direction. The passage opening-closing mechanisms 16 are respectively provided at bottom portions of the plurality of housing tanks 14. In the present embodiment, for example, three housing tanks 14 are provided. A large number of carbon dioxide adsorbing materials K are housed in each of the housing tanks 14. Each of a large number of carbon dioxide adsorbing materials K is prepared by causing porous substances to support an adsorbing liquid capable of adsorbing carbon dioxide.

Examples of the porous substance include activated carbon and activated alumina. Each of the activated carbon and the activated alumina includes a large number of fine holes on its surface, and the amount of adsorbing liquid, such as an amine compound, supported by each of the activated carbon and the activated alumina is large. In addition, each of the activated carbon and the activated alumina is suitable for the adsorption of carbon dioxide after supporting the amine compound or the like. Since the activated carbon is low in volume density, the carbon dioxide adsorbing materials K that are light in weight can be manufactured by using the activated carbon. In addition, the activated carbon is preferable since it can deodorize slight ammonia odor of the amine compound. As the activated carbon suitable for the carbon dioxide adsorbing materials K, it is preferable that an average pore diameter be 20 to 100 Å, a pore volume be 1.0 to 2.0 cc/g, and a specific surface area be 1,000 to 2,000 m2/g.

As the carbon dioxide adsorbing liquid (adsorbing liquid), the amine compound is preferable. Examples of the amine compound include polyethylenimine, monoethanolamine, diethanolamine, triethanolamine, tetraethylenepentamine, methyldiethanolamine, isopropanolamine, diisopropanolamine, dibutylamine, diethylenetriamine, triethylenetetramine, hexaethylenediamine, benzylamine, and morpholine. Among these, monoethanolamine, diethanolamine, and a mixture of these are preferable since each of monoethanolamine, diethanolamine, and the mixture of these can desorb the carbon dioxide by heating at a comparatively low temperature, and can be easily recovered even after evaporation.

In the present embodiment, when causing the porous substance to support the amine compound, for example, when causing the porous substance to support the diethanolamine, the activated carbon is immersed in a diethanolamine aqueous solution whose concentration is adjusted in a range from 10 to 55%, and then filtered and dried. Typically, the carbon dioxide adsorbing materials K whose amine support amount is 20 to 200 weight % are obtained.

As shown in FIG. 1, the passage opening-closing mechanisms 16 are respectively provided at the bottom portions of an upper housing tank 14, a middle housing tank 14, and a lower housing tank 14. The passage opening-closing mechanisms 16 can independently open or close the respective bottom portions (the fluid treatment passage 17) to store or discharge the adsorbing liquid supplied to the housing tanks 14 and allow or block the gas flow. Since the passage opening-closing mechanisms 16 respectively provided at three housing tanks 14 are the same as one another, the passage opening-closing mechanism 16 of the upper housing tank 14 will be explained, and explanations of the other passage opening-closing mechanisms 16 are omitted.

Figure 2:
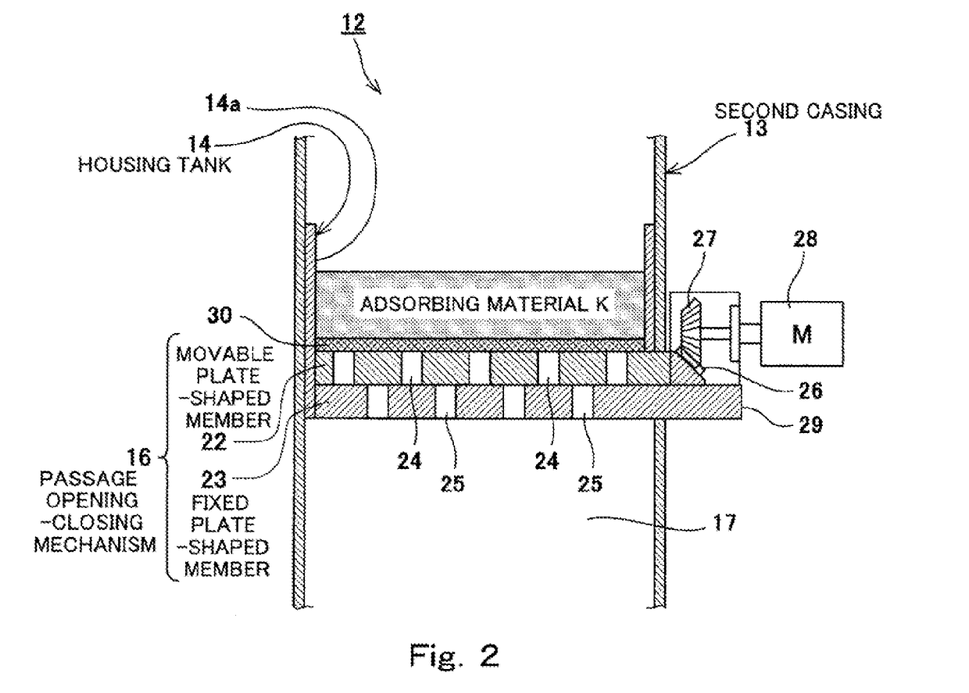
FIG. 2 is an enlarged cross-sectional view showing a housing tank included in a carbon dioxide recovery device according to the embodiment of the present invention.
Figure 3:
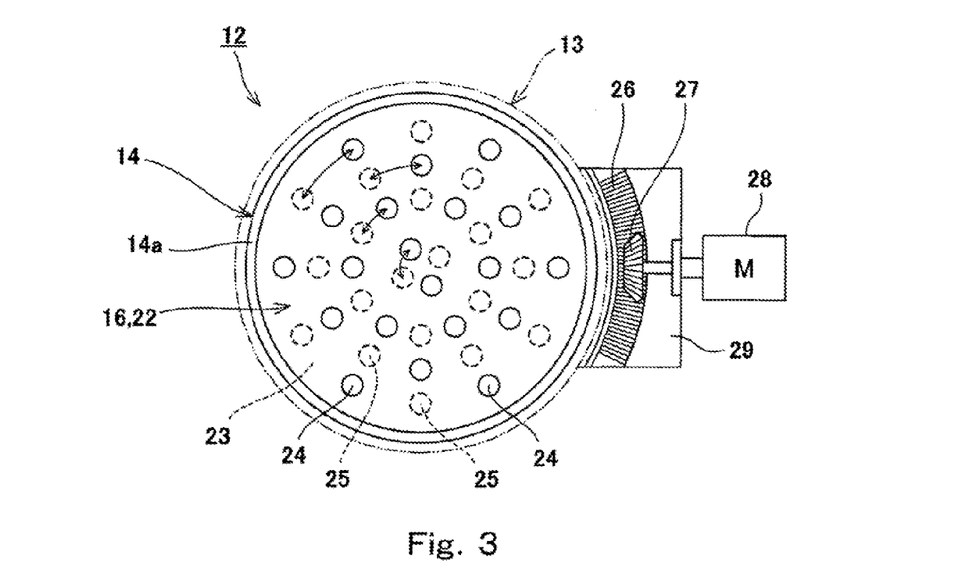
FIG. 3 is an enlarged plan view of the housing tank shown in FIG. 2.

As shown in FIGS. 2 and 3, the passage opening-closing mechanism 16 provided at the bottom portion of the upper housing tank 14 includes an upper movable plate-shaped member 22 and a lower fixed plate-shaped member 23, which constitute the bottom portion of the housing tank 14. The movable plate-shaped member 22 and the fixed plate-shaped member 23 are circular plate-shaped bodies having substantially the same radius as each other and are arranged so as to overlap each other in the upper-lower direction. A larger number of first through holes 24 are dispersively formed on the movable plate-shaped member 22, and a large number of second through holes 25 are dispersively formed on the fixed plate-shaped member 23. Each of the movable plate-shaped member 22 and the fixed plate-shaped member 23 is formed by, for example, a Teflon (trademark) based material having a small friction coefficient.

As shown in FIG. 2, an outer peripheral portion of the fixed plate-shaped member 23 is joined to an inner peripheral surface of a lower portion of a cylindrical side wall portion 14a constituting the housing tank 14, and the side wall portion 14a is provided so as to be fixed to an inner peripheral surface of the first casing 13.

The movable plate-shaped member 22 is arranged on an upper surface of the fixed plate-shaped member 23 so as to be rotatable about a center portion of the movable plate-shaped member 22. A circular-arc large bevel gear 26 constituting a part of a large-diameter bevel gear is provided at an outer peripheral portion of the movable plate-shaped member 22, and a small bevel gear 27 meshes with the large bevel gear 26. The small bevel gear 27 is provided at a rotating shaft of an electric motor 28. The electric motor 28 is attached to an attachment stand 29 provided at the fixed plate-shaped member 23.

As shown in FIG. 2, a net-like member 30 is arranged between an upper surface of the movable plate-shaped member 22 and a large number of carbon dioxide adsorbing materials K in the housing tank 14. The net-like member 30 holds the carbon dioxide adsorbing materials K to prevent the carbon dioxide adsorbing materials K from falling from the housing tank 14 through the through holes 24 and 25.

Next, the actions of the passage opening-closing mechanism 16 configured as above will be explained. As shown in FIGS. 2 and 3, currently, the passage opening-closing mechanism 16 is in a closed state (immersion mode) where a large number of first through holes 24 of the movable plate-shaped member 22 and a large number of second through holes 25 of the fixed plate-shaped member 23 do not overlap each other. In this closed state, when the electric motor 28 is rotated, for example, in a normal direction by a predetermined angle, the movable plate-shaped member 22 shown in FIG. 3 rotates in a clockwise direction by a predetermined angle. Thus, the passage opening-closing mechanism 16 can become an open state (discharge mode) where a large number of first through holes 24 of the movable plate-shaped member 22 and a large number of second through holes 25 of the fixed plate-shaped member 23 overlap each other.

As above, when in the open state (discharge mode), for example, the adsorbing liquid stored in the housing tank 14 can be discharged from the housing tank 14 through a large number of first and second through holes 24 and 25. In addition, a treatment target gas containing carbon dioxide, a dry gas (such as an inactive gas), a heated gas (such as heated steam), or the like described below can flow therethrough.

Next, in this open state (discharge mode), when the electric motor 28 is rotated, for example, in a reverse direction by a predetermined angle, the movable plate-shaped member 22 shown in FIG. 3 rotates in a counterclockwise direction by a predetermined angle. Thus, the passage opening-closing mechanism 16 can become the closed state (immersion mode) where a large number of first through holes 24 of the movable plate-shaped member 22 and a large number of second through holes 25 of the fixed plate-shaped member 23 do not overlap each other (closed state shown in FIGS. 2 and 3).

As above, when in the closed state (immersion mode), the adsorbing liquid supplied from the adsorbing liquid supplying portion 15 can be stored in the housing tank 14. In addition, the flow of the treatment target gas containing the carbon dioxide, the dry gas (inactive gas), the heated gas (such as heated steam), or the like described below can be stopped.

In the present embodiment, the state of the passage opening-closing mechanism 16 can be changed between the open state and the closed state by driving the electric motor 28. However, instead of this, the state of the passage opening-closing mechanism 16 may be manually changed between the open state and the closed state.

Next, the adsorbing liquid supplying portion 15 will be explained. As shown in FIG. 1, the adsorbing liquid supplying portions 15 is configured to supply the adsorbing liquid to the housing tank 14 and includes a first adsorbing liquid supplying portion 15 and a second adsorbing liquid supplying portion 15. The first adsorbing liquid supplying portion 15 is provided at a position above the upper housing tank 14 so as to be able to supply the adsorbing liquid to the upper housing tank 14. The second adsorbing liquid supplying portion 15 is provided at a position above the lower housing tank 14 so as to be able to supply the adsorbing liquid to the lower housing tank 14.

Each of the first and second adsorbing liquid supplying portions 15 can spray the adsorbing liquid in the form of liquid droplets by using showers to a large number of carbon dioxide adsorbing materials K in the corresponding housing tank 14 or a large number of porous substances in the corresponding housing tank 14.

As shown in FIG. 1, an adsorbing liquid circulation line 31 is provided outside the first casing 13. The adsorbing liquid circulation line 31 includes a common pipe 31a and two branch pipes 31b branching from one end portion of the common pipe 31a. The other end portion of the common pipe 31a is connected to the adsorbing liquid exhaust port 21 provided at the lower portion of the first casing 13. Then, end portions of the two branch pipes 31b are respectively connected to the first and second adsorbing liquid supplying portions 15.

Further, a solution tank 32 and an adsorbing liquid supply pump 33 are respectively disposed on portions of the common pipe 31a. The solution tank 32 can store the adsorbing liquid discharged through the adsorbing liquid exhaust port 21 of the first casing 13. The adsorbing liquid supply pump 33 pumps the adsorbing liquid, stored in the solution tank 32, to the first and second adsorbing liquid supplying portions 15. A valve 34 is disposed on the common pipe 31a, and valves 35 and 36 are respectively disposed on the end portions of the two branch pipes 31b.

As shown in FIG. 1, as with the first carbon dioxide recovery device 12, the first and second adsorbing liquid supplying portions 15, the two branch pipes 31b, and the valves 34, 35, and 36 are provided at the second carbon dioxide recovery device 12. The two branch pipes 31b respectively connected to the first and second adsorbing liquid supplying portions 15 are connected to the common pipe 31a through a connecting pipe 37. The adsorbing liquid exhaust port 21 of a second casing 13 is connected to the solution tank 32 through a connecting pipe 38. The valve 34 is disposed on the connecting pipe 38.

Next, referring to FIG. 1, the following will explain a treatment target gas supply line 39 through which the treatment target gas (CO2-containing gas) containing the carbon dioxide can be supplied to the first and second casings 13 of the first and second carbon dioxide recovery devices 12 and as clean gas exhaust line 40 through which the clean gas whose carbon dioxide concentration has been decreased can be discharged from the first and second casings 13.

As shown in FIG. 1, the treatment target gas supply line 39 includes a common pipe 39a and two branch pipes 39b branching from one end portion of the common pipe 39a. The other end portion of the common pipe 39a is connected to an outlet port of a treatment target gas exhaust line (not shown) through which indoor air of as sealed living space, indoor air of an air-conditioned office or the like, or a flue gas discharged from a boiler or the like is discharged. End portions of the two branch pipes 39b are respectively connected to the gas supply ports 18 respectively provided at the upper wall portions of the first and second casings 13. Valves 41 and 42 are respectively disposed on the two branch pipes 39b.

Further, a condenser 44 and a heater 45 are respectively disposed on portions of the common pipe 39a. The condenser 44 is a cooler and can condense moisture contained in the treatment target gas flowing through the common pipe 39a to remove (recover) the moisture. Then, the heater 45 is, for example, a heat exchanger configured to utilize exhaust heat or an electric heater and can heat the treatment target gas flowing through the common pipe 39a to a desired temperature to prevent the dew condensation from the treatment target gas when, for example, the treatment target gas contacts the carbon dioxide adsorbing materials K stored in the housing tank 14.

As shown in FIG. 1, the clean gas exhaust line 40 includes a common pipe 40a and two branch pipes 40b branching from one end portion of the common pipe 40a. The other end portion of the common pipe 40a is open to the outside through, for example, a chimney 46. Then, a bug filter and an exhaust blower 48 are respectively disposed on portions of the common pipe 40a.

As above, the clean gas may be discharged to the outside through the other end portion of the common pipe 40a. However, when cleaning indoor air of a sealed living space or indoor air of an air-conditioned office or the like as the treatment target gas, clean air obtained by cleaning the treatment target gas can be returned to the sealed living space or the air-conditioned office or the like. As above, by returning the clean air to the original space, the increase in the carbon dioxide concentration (decrease in the oxygen concentration) in a living space or the like can be prevented, and the waste of the air-conditioning energy for cooling or heating can be prevented.

Then, end portions of the two branch pipes 40b are respectively connected to the gas exhaust ports 19 respectively formed at the lower portions of the first and second casings 13. Vases 49 and 50 are respectively disposed on the two branch pipes 40b.

Next, referring to FIG. 1, the following will explain a dry gas circulation line 51 through which a dry gas, such as an inactive gas, can circulate in the first and second casings 13. The dry gas circulation line 51 can cause the dry gas, discharged from the first and second casings 13, to return to the first and second casings 13, that is, to circulate to dry the carbon dioxide adsorbing materials K in the upper housing tank 14, the middle housing tank 14, and the lower housing tank 14.

Therefore, the dry gas circulation line 51 and the fluid treatment passage 17 in the first casing 13 constitute a dry gas circulation line in the first carbon dioxide recovery device 12. Then, the dry gas circulation line 51 and the fluid treatment passage 17 in the second casing 13 constitute a dry gas circulation line in the second carbon dioxide recovery device 12.

As shown in FIG. 1, the dry gas circulation line 51 includes a common pipe 51a, two upstream branch pipes 51b branching from an upstream end portion of the common pipe 51a, and two downstream branch pipes 51c branching from a downstream end portion of the common pipe 51a. Then, end portions of the two upstream branch pipes 51b are respectively connected to the gas supply ports 18 respectively provided at the upper wall portions of the first and second casings 13, and valves 52 and 53 are respectively disposed on the two upstream branch pipes 51b. End portions of the two downstream branch pipes 51c are respectively connected to the gas exhaust ports 19 respectively provided at the peripheral wall portions of the first and second casings 13, and valves 54 and 55 are respectively disposed on the two downstream branch pipes 51c.

A drying blower 56 is disposed on a portion of the common pipe 51a. As shown in FIG. 1, each of the condenser 44 and the heater 45 is disposed on both the common pipe 51a and the dry gas circulation line 51 and the common pipe 39a of the treatment target gas supply line 39 so as to be used by both the common pipes 51a and 39a.

Further, a supply pipe 57 through which the dry gas (such as an inactive gas) or the heated gas is supplied is connected to a position of the common pipe 51a of the dry gas circulation line 51, the position being close to the upstream branch portions 51b, and a valve 58 is disposed on the supply pipe 57.

Next, the actions of the carbon dioxide recovery system 11 configured as above will be explained. Each of the first and second carbon dioxide recovery devices 12 included in the carbon dioxide recovery system 11 can perform the adsorption treatment, the regeneration treatment, the repair treatment, and the manufacture treatment. The carbon dioxide recovery system 11 is controlled such that while one of the first and second carbon dioxide recovery devices 12 is performing the adsorption treatment, the other performs the regeneration treatment, the repair treatment, and the manufacture treatment. With this, the adsorption treatment of adsorbing the carbon dioxide contained in the treatment target gas can be continuously performed without interruption by using either one of the carbon dioxide recovery devices 12 included in the carbon dioxide recovery system 11.

Next, procedures of the adsorption treatment, the regeneration treatment, the repair treatment, and the manufacture treatment using the first and second carbon dioxide recovery devices 12 shown in FIG. 1 and the actions of the second carbon dioxide recovery device 12 will be explained.

First, the adsorption treatment will be explained in reference to the second carbon dioxide recovery device 12 shown on the right side in FIG. 1. The adsorption treatment is a treatment of generating a clean gas whose carbon dioxide concentration has been reduced, by causing the carbon dioxide adsorbing materials K to adsorb the carbon dioxide contained in the treatment target gas, the carbon dioxide adsorbing materials K being prepared by causing the porous substances to support the adsorbing liquid capable of adsorbing the carbon dioxide.

The following will explain an example in which the carbon dioxide recovery system 11 of the present embodiment adsorbs (recovers) the carbon dioxide contained in the flue gas discharged from a boiler or the like to discharge to the outside the clean gas whose carbon dioxide concentration has been reduced.

When performing the adsorption treatment, the carbon dioxide adsorbing materials K are put in the three housing tanks 14 provided in the second casing 13 shown on the right side in FIG. 1. Then, the respective valves are opened or closed, and the three passage opening-closing mechanisms 16 are manipulated to become the open state such that the treatment target gas is discharged to the outside through the treatment target gas supply line, the fluid treatment passage in the second casing, and the clean gas exhaust line. Specifically, the valves 42 and 50 are opened, and the other valves are closed.

In this state, the treatment target gas is supplied through the treatment target gas supply line 39 to the gas supply port 18 of the second casing 13 to flow through the adsorbing materials K in the upper housing tank 14, the first and second through holes 24 and 25 in the open state, the adsorbing materials K in the middle housing tank 14, the first and second through holes 24 and 25 in the open state, the adsorbing materials K in the lower housing tank 14, and the first and second through holes 24 and 25 in the open state.

With this, the carbon dioxide contained in the treatment target gas contacts the carbon dioxide adsorbing materials K in the three housing tanks 14 in the fluid treatment passage 17 to be adsorbed by the carbon dioxide adsorbing materials K (adsorption treatment). With this, the clean gas whose carbon dioxide concentration is low can be discharged to the outside through the as exhaust port 19 and the clean gas exhaust line 40. Thus, the carbon dioxide can be recovered from the treatment target gas.

Next, the regeneration treatment will be explained in reference to the second carbon dioxide recovery device 12 shown on the right side in FIG. 1. The regeneration treatment is a treatment of separating the carbon dioxide, adsorbed by the carbon dioxide adsorbing materials K, to regenerate the carbon dioxide adsorbing materials K. As above, the reason why the carbon dioxide adsorbing materials K are subjected to the regeneration treatment is because in order that the carbon dioxide adsorbing materials K efficiently adsorb the carbon dioxide, the amount of carbon dioxide adsorbed in the carbon dioxide adsorbing materials K needs to be equal to or smaller than a certain amount.

When performing the regeneration treatment, the carbon dioxide adsorbing materials K to be subjected to the regeneration treatment are filled in the three housing tanks 14. Then, the respective valves are opened or closed, and the three passage opening-closing mechanisms 14 are manipulated to become the open state such that the heated gas or the heated steam is supplied from the supply pipe 57 through the upstream branch line 51b, the fluid treatment passage 17 in the second casing 13, and a carbon dioxide discharge pipe 59 to be stored in a storage portion. Specifically, the valves 58, 53, and 70 are opened, and the other valves are closed.

In this state, for example, the heated gas or the heated steam is supplied from the supply pipe 57 through the gas supply port 18 of the second casing 13 to flow through the adsorbing materials K in the upper housing tank 14, the first and second through holes 24 and 25 in the open state, the adsorbing materials K in the middle housing tank 14, the first and second through holes 24 and 25 in the open state, the adsorbing materials K in the lower housing tank 14, and the first and second through holes 24 and 25 in the open state.

With this, the heated gas or the like can heat the carbon dioxide adsorbing materials K in the three housing tanks 14 in the fluid treatment passage 17. As a result, the carbon dioxide can be separated from the carbon dioxide adsorbing materials K. The separated carbon dioxide can be discharged through the carbon dioxide discharge pipe 59. The discharged carbon dioxide can be, for example, compressed and stored in the storage portion, and the storage portion can be buried in the ground. Thus, the carbon dioxide adsorbing materials K can be regenerated (regeneration treatment).

After the regeneration of the carbon dioxide adsorbing materials K, a cooling gas (such as an inactive gas) is supplied through the supply pipe 57 instead of the heated as or the like to cool the carbon dioxide adsorbing materials K in the three housing tanks 14. With this, a state where the adsorption treatment can be performed can be realized. The cooling gas is discharged to the outside through the chimney 46 of the clean gas exhaust line 40.

The carbon dioxide discharge pipes 59 are respectively connected to inflow openings of the valves 49 and 50 respectively disposed on the two branch pipes 40b of the clean gas exhaust line 40, and valves 43 are respectively disposed on the carbon dioxide discharge pipes 59.

Next, the repair treatment will be explained in reference to the first carbon dioxide recovery device 12 shown on the left side in FIG. 1. The repair treatment is a treatment of causing the carbon dioxide adsorbing materials K, whose carbon dioxide adsorption performance has been deteriorated, to support the adsorbing liquid to improve the carbon dioxide adsorption performance of the carbon dioxide adsorbing materials K.

When performing the repair treatment, the valves 34, 35, and 36 shown in FIG. 1 are opened, and the other valves are closed. Then, the passage opening-closing mechanisms 16 of the three housing tanks 14 in the first casing 13 shown on the left side in FIG. 1 are manipulated to become the closed state (immersion mode). The three housing tanks 14 house the carbon dioxide adsorbing materials K to be subjected to the repair treatment.

Next, the valve 35 is opened, and the adsorbing liquid supply pump 33 is started up. At this time, the adsorbing liquid is sprayed in the form of shower from the first adsorbing liquid supplying portion 15 located on an upper side. Thus, the adsorbing liquid can be supplied to the upper housing tank 14. Then, when the carbon dioxide adsorbing materials K in the upper housing tank 14 are completely immersed in the adsorbing liquid, the adsorbing liquid supply pump 33 is stopped, and the valve 35 is closed.

After a predetermined period of time has elapsed, the carbon dioxide adsorbing materials K in the upper housing tank 14 can support the adsorbing liquid. After that, the passage opening-closing mechanism 16 of the upper housing tank 14 is manipulated to become the open state (discharge mode), so that the adsorbing liquid in the upper housing tank 14 is discharged through the first and second through holes 24 and 25 of the passage opening-closing mechanism 16.

The adsorbing liquid discharged from the upper housing tank 14 is supplied to the middle housing tank 14, and the carbon dioxide adsorbing materials K in the middle housing tank 14 are completely immersed in the adsorbing liquid.

After a predetermined period of time has elapsed, the carbon dioxide adsorbing materials K in the middle housing tank 14 can support the adsorbing liquid. After that, the passage opening-closing mechanism 16 of the middle housing tank 14 is manipulated to become the open state (discharge mode), so that the adsorbing liquid in the middle housing tank 14 is discharged through the first and second through holes 24 and 25 of the passage opening-closing mechanism 16.

The adsorbing liquid discharged from the middle housing tank 14 is supplied to the lower housing tank 14, and the carbon dioxide adsorbing materials K in the lower housing tank 14 are completely immersed in the adsorbing liquid.

After a predetermined period of time has elapsed, the carbon dioxide adsorbing materials K in the lower housing tank 14 can support the adsorbing liquid. After that, the passage opening-closing mechanism 16 of the lower housing tank 14 is manipulated to become the open state (discharge mode), so that the adsorbing liquid in the lower housing tank 14 is returned to the solution tank 32 through the first and second through holes 24 and 25 of the passage opening-closing mechanism 16 and the adsorbing liquid exhaust port 21 formed at the lower wall portion of the first casing 13. Then, the valve 34 is closed.

Next, a drying treatment of drying the carbon dioxide adsorbing materials K in the three housing tanks 14 is performed. First, the valves 58, 52, 49, and 54 are opened, and the other valves are closed. In this state, the dry gas (such as an inactive gas) is supplied from the supply pipe 57 through the gas supply port 18 to flow into the fluid treatment passage 17 of the first casing 13. Thus, the air in the fluid treatment passage 17 of the first casing 13 and in the dry gas circulation line 51 is replaced with the dry gas (inactive gas). Then, the valves 58 and 49 are closed. Then, the drying blower 56 is started up to cause the dry gas to circulate through the fluid treatment passage 17 and the dry gas circulation line 51. With this, the carbon dioxide adsorbing materials K housed in the three housing tanks 14 and supporting the adsorbing liquid can be dried.

While the dry gas is circulating as above, water accumulated at the bottom of the first casing 13 can be discharged through the drain port 20, and moisture in the dry gas can be recovered by the condenser 44. Then, the heater 45 can heat the dry gas to adjust the temperature of the dry gas, thereby accelerating the drying treatment. With this, the carbon dioxide adsorbing materials K supporting the adsorbing liquid can be efficiently dried.

After the drying treatment, the drying blower 56 is stopped, the valves 52 and 54 are closed, and the drain valve 43 is opened. After the drain discharge, the drain valve 43 is closed. As above, the repair treatment of the carbon dioxide adsorbing materials K can be performed.

Next, the manufacture treatment will be explained. The manufacture treatment is a treatment of manufacturing the carbon dioxide adsorbing materials K. The manufacture treatment and repair treatment of the carbon dioxide adsorbing materials K are different from each other in that in the repair treatment, the carbon dioxide adsorbing materials K whose carbon dioxide adsorption performance has been deteriorated are housed in the housing tank 14, the adsorbing liquid is filled in the housing tank 14, and the carbon dioxide adsorbing materials K are immersed in the adsorbing liquid, so that the carbon dioxide adsorbing materials K support the adsorbing liquid; whereas in the manufacture treatment, the porous substances are housed in the housing tank 14, the adsorbing liquid is filled in the housing tank 14, and the porous substances are immersed in the adsorbing liquid, so that the porous substances support the adsorbing liquid. Other than these, the manufacture treatment is the same as the repair treatment, so that an explanation thereof is omitted.

Each of the first and second carbon dioxide recovery devices 12 configured as above can perform the adsorption treatment of the carbon dioxide, the regeneration treatment of the carbon dioxide adsorbing materials K, the repair treatment of the carbon dioxide adsorbing materials K, and the manufacture treatment of the carbon dioxide adsorbing materials K. Therefore, an adsorption-regeneration device for performing the adsorption treatment and the regeneration treatment and a repair-manufacture device for performing the repair treatment and the manufacture treatment do not have to be prepared separately. As above, the adsorption treatment, the regeneration treatment, the repair treatment, and the manufacture treatment can be performed by using a single device. As a result, the carbon dioxide recovery device having these treatment functions can be reduced in cost, size, and installation space.

Further, when repairing or manufacturing the carbon dioxide adsorbing materials K, the adsorbing liquid is just filled in the housing tank 14 and does not have to be filled in the entire casing 13. Therefore, the amount of adsorbing liquid required can be reduced.

Then, according to the passage opening-closing mechanism 16 shown in FIGS. 2 and 3, only by causing the movable plate-shaped member 22 to move to a predetermined open position or closed position, the fluid treatment passage 17 (the bottom portion of the housing tank 14) can be opened or closed. Therefore, the passage opening-closing mechanism 16 used to perform the adsorption treatment, the regeneration treatment for regeneration, the repair treatment, and the manufacture treatment can be simplified in configuration and reduced in size.

A large number of first through holes 24 are dispersively formed on the movable plate-shaped member 22, and a large number of second through holes 25 are dispersively formed on the fixed plate-shaped member 23. Therefore, when performing each of the adsorption treatment, the regeneration treatment, the repair treatment, and the manufacture treatment, the adsorbing liquid, the treatment target gas, the dry gas, the heated gas (heated steam), or the cooling gas can be caused to flow through a large number of dispersively-formed first and second through holes 24 and 25 to evenly contact the carbon dioxide adsorbing materials K or porous substances in the middle and lower housing tanks 14 arranged under the first and second through holes 24 and 25. With this, each treatment using the adsorbing liquid, the treatment target gas, the dry gas, the heated gas (heated steam), or the cooling gas can be surely performed in a short period of time. Further, the carbon dioxide separated from the carbon dioxide adsorbing materials K can be discharged smoothly without being accumulated in the housing tank 14.

In each of the repair treatment and the manufacture treatment, in a case where an inactive gas is used as a cooling gas or a dry gas for drying the adsorbing liquid supported by the carbon dioxide adsorbing materials K or the porous substances, the oxidation of the adsorbing liquid supported by the carbon dioxide adsorbing materials K or the porous substances can be prevented, and the deterioration of the carbon dioxide adsorption performance of the adsorbing liquid can be prevented. Then, the inactive gas is caused to circulate in the circulation line, constituted by the fluid treatment passage 17 and the dry gas circulation line 51, to dry the carbon dioxide adsorbing materials K or the like. Thus, the carbon dioxide adsorbing materials K or the like can be dried by using a small amount of inactive gas.

Further, according to the first and second carbon dioxide recovery devices 12 shown in FIG. 1, the condenser 44 and the heater 45 are disposed on the dry gas circulation line 51. With this, the condenser 44 can condense and remove moisture (containing moisture evaporated from the carbon dioxide adsorbing materials K) contained in the inactive gas as the dry gas. Then, the heater 45 can heat the inactive gas to accelerate the drying of the carbon dioxide adsorbing materials K. With this, the carbon dioxide adsorbing materials K in the housing tanks 14 can be efficiently dried.

Then, according to each of the first and second carbon dioxide recovery devices 12 shown in FIG. 1, the three housing tanks 14 are arranged along the upper-lower direction in each of the first and second casings 13, and the passage opening-closing mechanisms 16 are respectively provided at the bottom portions of the three housing tanks 14. Therefore, when regenerating or manufacturing the carbon dioxide adsorbing materials K, the adsorbing liquid is supplied to the upper housing tank 14, and the adsorbing liquid supplied to the upper housing tank 14 can be then transferred to the middle housing tank 14 located under the upper housing tank 14. Further, the adsorbing liquid transferred to the middle housing tank 14 can be then transferred to the lower housing tank 14 located under the middle housing tank 14.

Therefore, by using the adsorbing liquid, the amount of which is an amount used by a single housing tank 14, the carbon dioxide adsorbing materials K or porous substances in a plurality of housing tanks 14 can support the adsorbing liquid. Therefore, the amount of adsorbing liquid used when repairing or manufacturing the carbon dioxide adsorbing materials K can be reduced.

As shown in FIG. 1, each of the adsorbing liquid supplying portions 15 is configured to spray the adsorbing liquid by using the showers to the carbon dioxide adsorbing materials K or porous substances in the housing tank 14. Therefore, when repairing or manufacturing the carbon dioxide adsorbing materials K, the adsorbing liquid can be evenly sprayed by using the showers to the carbon dioxide adsorbing materials K or porous substances in the upper housing tank 14.

As above, by spraying the adsorbing liquid using the showers to the carbon dioxide adsorbing materials K or the porous substances, the adsorbing liquid can be surely supported by the entire surfaces of the carbon dioxide adsorbing materials K or the like without forming air bubbles on the surfaces of the carbon dioxide adsorbing materials K or the like. According to the repaired or manufactured carbon dioxide adsorbing materials K, the carbon dioxide adsorption ability thereof can be improved and uniformized.

Further, according to the carbon dioxide recovery system 11 shown in FIG. 1, while one of the first and second carbon dioxide recovery devices 12 is performing the adsorption treatment of adsorbing the carbon dioxide contained in the treatment target gas, the other can concurrently perform the regeneration treatment, the repair treatment, and the manufacture treatment. With this, the adsorption treatment of adsorbing the carbon dioxide contained in the treatment target gas can be continuously performed without interruption by using either one of the carbon dioxide recovery devices 12 included in the carbon dioxide recovery system 11. Further, since the adsorption treatment, the regeneration treatment, the repair treatment, and the manufacture treatment can be monitored collectively, the cost for the operation management can be suppressed.

In the above embodiment, when regenerating or manufacturing the carbon dioxide adsorbing materials K, the adsorbing liquid is supplied to the upper housing tank 14 from, for example, one adsorbing liquid supplying portion 15 of the first carbon dioxide recovery device 12 shown in FIG. 1, and the adsorbing liquid supplied to the upper housing tank 14 is transferred to the middle housing tank 14 and the lower housing tank 14. Thus, these three housing tanks 14 are used one by one from the upper one, and the carbon dioxide adsorbing materials K or the porous substances support the adsorbing liquid. However, instead of this, for example, the two adsorbing liquid supplying portions 15 of the first carbon dioxide recovery device 12 shown in FIG. 1 may supply the adsorbing liquid to the upper housing tank 14 and the lower housing tank 14, respectively. Thus, by using both the upper housing tank 14 and the lower housing tank 14 at the same time, the carbon dioxide adsorbing materials K or the porous substances may support the adsorbing liquid.

In this case, after the carbon dioxide adsorbing materials K or the like support the adsorbing liquid in the upper housing tank 14, the adsorbing liquid in the upper housing tank 14 is transferred to the middle housing tank 14, and the carbon dioxide adsorbing materials K or the like support the adsorbing liquid in the middle housing tank 14.

The adsorbing liquid in the lower housing tank 14 is discharged from the lower housing tank 14 to be returned to the solution tank 32. Then, the adsorbing liquid transferred to the middle housing tank 14 is transferred to the lower housing tank 14, and the adsorbing liquid is then discharged from the lower housing tank 14 to be returned to the solution tank 32.

With this, it is possible to shorten a repair time of repairing the carbon dioxide adsorbing materials K in a plurality of housing tanks 14 in the first and second casings 13 and 14 and a manufacture time of manufacturing the carbon dioxide adsorbing materials K from the porous substances.

In the above embodiment, each of the first and second carbon dioxide recovery devices 12 is provided with three housing tanks 14. However, instead of this, each of the first and second carbon dioxide recovery devices 12 may be provided with one, two, or four or more housing tanks 14.

In the above embodiment, the two carbon dioxide recovery devices 12 are provided. However, instead of this, three or more carbon dioxide recovery devices 12 may be provided. In this case, for example, these carbon dioxide recovery devices 12 may be configured such that while one or more carbon dioxide recovery devices 12 are performing the adsorption treatment, the remaining one or more carbon dioxide recovery devices 12 perform the regeneration treatment, the repair treatment, and the manufacture treatment.

Further, a single carbon dioxide recovery device 12 relay be provided. In this case, the adsorption treatment, the regeneration treatment, the repair treatment, and the manufacture treatment may be performed by using the single carbon dioxide recovery device 12.

Further, in the above embodiment, as shown in FIG. 1, one gas supply port 18 is formed at each of the upper portions of the first and second casings 13, and one gas exhaust port 19 is formed at each of the lower portions of the first and second casings 13. However, configurations other than this may be adopted. For example, two or more gas supply ports 18 are formed at each of the upper portions of the first and second casings 13, and two or more gas exhaust ports 19 are formed at each of the lower portions of the first and second casings 13.

With this, the treatment target gas is supplied to the casing 13 through one gas supply port, and the dry gas, the heated gas (heated steam), or the cooling gas is supplied to the casing 13 through the other (another) gas supply port. In addition, the clean gas in the casing 13 is discharged through one gas exhaust port, and the other gases are discharged through the other (another) gas exhaust port. With this, the dedicated gas supply ports and gas exhaust ports can be used when performing the adsorption treatment. Thus, the adsorption treatment can be stably performed.

In the above embodiment, as shown in FIGS. 2 and 3, the passage opening-closing mechanism 16 is provided at the bottom portion of the housing tank 14. However, instead of this, the passage opening-closing mechanism 16 may be provided under the bottom portion of the housing tank 14 so as to be spaced apart from the bottom portion. In this case, as with the above embodiment, the bottom portion of the housing tank 14 is formed by the net-like member 30, so that it can hold the carbon dioxide adsorbing materials K.

In the above embodiment, as shown in FIGS. 2 and 3, the passage opening-closing mechanism 16 is provided at the bottom portion of the housing tank 14, and the fluid treatment passage 17 can be opened or closed by rotating the movable plate-shaped member 22 in the clockwise direction or the counterclockwise direction. However, instead of this, as shown in FIGS. 4 and 5, a passage opening-closing mechanism 60 may be provided under the bottom portion of the housing tank 14 so as to be spaced apart from the bottom portion.

The passage opening-closing mechanism 60 is configured such that: a supporting plate 61 is substantially horizontally provided on the inner surface of the first casing 13; the supporting plate 61 includes an opening portion 61a having, for example, a rectangular shape; and a movable plate 62 having, for example, a rectangular shape is arranged on an upper surface of the supporting plate 61. The opening portion 61a can be opened or closed by the horizontal movement of the movable plate 62 in a front-rear direction.

Then, a rack 63 is provided on an upper surface of one edge portion of the movable plate 62, the edge portion being parallel to a movement direction. A pinion 64 is provided so as to mesh with the rack 63. The pinion 64 is rotated by the electric motor 28 in a normal direction or a reverse direction. With this, the movable plate 62 can move forward or backward to close or open the opening portion 61a. The movable plate 62 shown in FIGS. 4 and 5 becomes the closed state when it is located at a forward position shown by a chain double-dashed line and becomes the open state when it is located at a backward position shown by a solid line.

Figure 4:
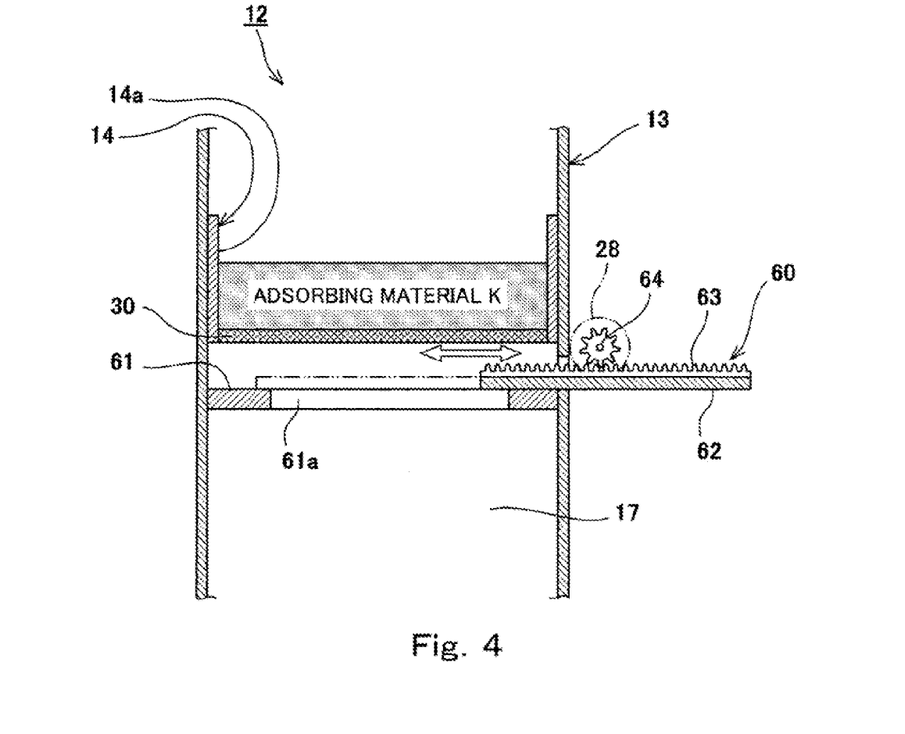
FIG. 4 is an enlarged cross-sectional view showing a passage opening-closing mechanism included in the carbon dioxide recovery device according to another embodiment of the present invention.
Figure 5:
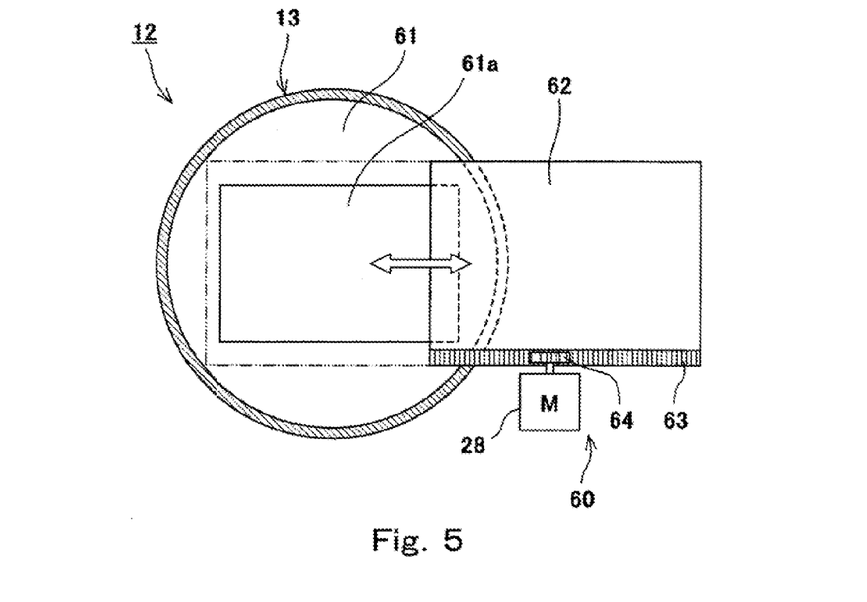
FIG. 5 is an enlarged plan view of the passage opening-closing mechanism shown in FIG. 4.

The passage opening-closing mechanism 60 shown in FIGS. 4 and 5 is provided under the bottom portion of the housing tank 14 so as to be spaced apart from the bottom portion. However, instead of this, the passage opening-closing mechanism 60 may be provided to contact the bottom portion of the housing tank 14 or may be provided at a position close to the bottom portion of the housing tank 14.

Of course, the passage opening-closing mechanism may have a configuration other than the above configuration.

INDUSTRIAL APPLICABILITY

As above, the carbon dioxide recovery device and carbon dioxide recovery system according to the present has an excellent effect in which the adsorption-regeneration function of adsorbing the carbon dioxide and regenerating the carbon dioxide adsorbing materials and the repair-manufacture function of repairing and manufacturing the carbon dioxide adsorbing materials can be achieved by a common device. Thus, the present invention is suitably applied to such carbon dioxide recovery device and carbon dioxide recovery system.

REFERENCE SIGNS LIST 11 carbon dioxide recovery system
12 carbon dioxide recovery device
13 first casing, second casing
14 housing tank
14a side wall portion of housing tank
15 adsorbing liquid supplying portion
16 passage opening-closing mechanism
17 fluid treatment passage
18 gas supply port
19 gas exhaust port
20 drain port
21 adsorbing liquid exhaust port
22 movable plate-shaped member
23 fixed plate-shaped member
24 first through hole
25 second through hole
26 large bevel gear
27 small bevel gear
28 electric motor
29 attachment stand
30 net-like member
31 adsorbing liquid circulation line
32 solution tank
33 adsorbing liquid supply pump
34, 35, 36, 41, 42, 43, 49 valve
50, 51, 53, 54, 55, 58, 70 valve
37, 38 connecting pipe
39 treatment target gas supply line
40 clean gas exhaust line
44 condenser
45 heater
46 chimney
47 bug filter
48 exhaust blower
51 dry gas circulation line
56 drying blower
57 supply pipe
59 carbon dioxide discharge pipe
60 passage opening-closing mechanism
61 supporting plate
61a opening portion
62 movable plate
63 rack
64 pinion
31a, 39a, 40a, 51a common pipe
31b, 39b, 40b branch pipe
51b upstream branch pipe
51c downstream branch pipe
K carbon dioxide adsorbing material

The invention claimed is:

1. A carbon dioxide recovery device configured to:
cause a carbon dioxide adsorbing material to adsorb carbon dioxide contained in a treatment target gas, the carbon dioxide adsorbing material being prepared by causing a porous substance to support an adsorbing liquid for adsorbing the carbon dioxide;
separate the carbon dioxide adsorbed by the carbon dioxide adsorbing material; and
causing the carbon dioxide adsorbing material or the porous substance to support the adsorbing liquid,
the carbon dioxide recovery device comprising:
a casing including
a fluid treatment passage through which a fluid flows,
one or two or more gas supply ports through which a gas is supplied to the fluid treatment passage, and
one or two or more gas exhaust ports through which the gas supplied to the fluid treatment passage is discharged;
a housing tank provided in the fluid treatment passage and configured to house the carbon dioxide adsorbing material; and
an adsorbing liquid supplying portion configured to supply the adsorbing liquid to the housing tank, wherein
a passage opening-closing mechanism configured to open or close the fluid treatment passage to discharge or store the adsorbing liquid supplied to the housing tank is provided at a bottom portion of the housing tank or under the housing tank.

2. The carbon dioxide recovery device according to claim 1, wherein:
the passage opening-closing mechanism includes a movable plate-shaped member and a fixed plate-shaped member;
a large number of through holes are dispersively formed on each of the movable plate-shaped member and the fixed plate-shaped member; and
when the movable plate-shaped member has moved to a predetermined open position or closed position, an open state where a large number of first through holes that are the large number of through holes of the movable plate-shaped member respectively overlap a large number of second through holes that are the large number of through holes of the fixed plate shaped member is realized, or a closed state where the large number of first through holes of the movable plate-shaped member do not overlap the large number of second through holes of the fixed plate-shaped member is realized.

3. The carbon dioxide recovery device according to claim 1, further comprising a circulation line, which includes the fluid treatment passage as a part thereof and through which an inactive gas circulates, wherein
the inactive gas dries the carbon dioxide adsorbing material in the housing tank.

4. The carbon dioxide recovery device according to claim 3, wherein a condenser configured to condense moisture contained in the inactive gas and a heater configured to heat the inactive gas are disposed in the circulation line of the inactive gas.

5. The carbon dioxide recovery device according to claim 1, wherein:
the housing tank is one of a plurality of housing tanks provided along an upper-lower direction in the casing; and
the passage opening-closing mechanism is one of a plurality of passage opening-closing mechanisms provided at the bottom portions of the plurality of housing tanks.

6. The carbon dioxide recovery device according to claim 5, wherein:
the plurality of housing tanks are one or two or more upper housing tanks provided at an upper side in the casing and one or two or more lower housing tanks provided at a lower side in the casing; and
the adsorbing liquid supplying portion is configured to supply the adsorbing liquid to an uppermost housing tank among said one or two or more upper housing tanks and an uppermost housing tank among said one or two or more lower housing tanks.

7. The carbon dioxide recovery device according to claim 1, wherein the adsorbing liquid supplying portion sprays the adsorbing liquid in the form of liquid droplets to the carbon dioxide adsorbing material or porous substance in the housing tank.

8. A carbon dioxide recovery system comprising a plurality of carbon dioxide recovery devices, each of which is the carbon dioxide recovery device according to claim 1, wherein
one of the carbon dioxide recovery devices performs an adsorption treatment of adsorbing the carbon dioxide contained in the treatment target gas, and the other carbon dioxide recovery device(s) performs a regeneration treatment of separating the carbon dioxide adsorbed by the carbon dioxide adsorbing material, a repair treatment of causing the carbon dioxide adsorbing material to support the adsorbing liquid, and a manufacture treatment of causing the porous substance to support the adsorbing liquid.

* * * * *